United States Patent [19]

Burt et al.

[11] Patent Number: 4,458,715
[45] Date of Patent: Jul. 10, 1984

[54] SOLENOID ACTUATED CONTROL VALVE

[75] Inventors: David L. Burt, Grosse Pointe; Gregory J. Krawczyk, Royal Oak, both of Mich.

[73] Assignee: The Bendix Corporation, Southfield, Mich.

[21] Appl. No.: 364,817

[22] Filed: Apr. 2, 1982

[51] Int. Cl.³ .............................................. F16K 31/02
[52] U.S. Cl. ..................................... 137/270; 251/129
[58] Field of Search ............................ 137/269.5, 270; 251/129

[56] References Cited

U.S. PATENT DOCUMENTS 2,735,047 2/1956 Garner et al. ........................ 251/129
3,878,859 4/1975 Grob et al. ......................... 137/270

Primary Examiner—Martin P. Schwadron
Assistant Examiner—Mark Malkin
Attorney, Agent, or Firm—Markell Seitzman; Russel C. Wells

[57] ABSTRACT

A solenoid control valve comprising a valve body enclosing an armature and reversible valve means including a valve seat adapted to be received within the valve body including at least one flow passage and a movable valve closure element such that when said valve seat is received in one orientation the solenoid control valve is of the normally open variety and when inserted in an opposite orientation said solenoid control valve is of normally closed variety.

5 Claims, 3 Drawing Figures

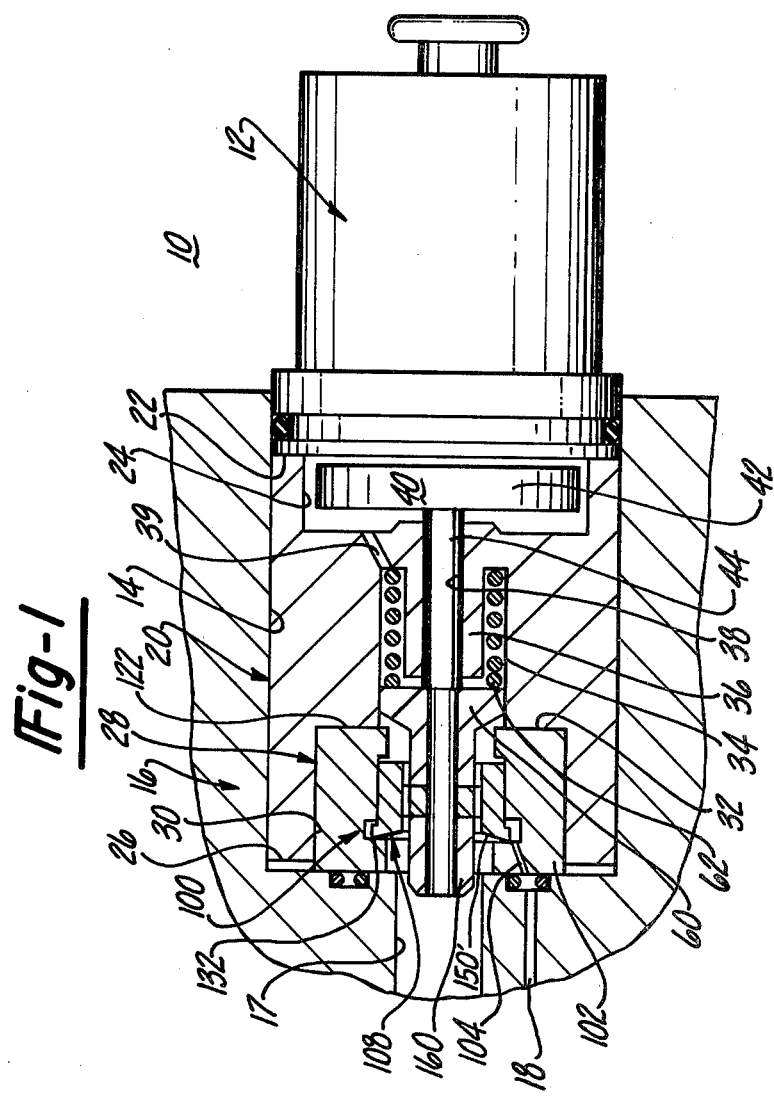

SOLENOID ACTUATED CONTROL VALVE

BACKGROUND AND SUMMARY OF THE INVENTION

The invention relates to solenoid actuated control valves and more particularly to a control valve having an interchangeable valve element which enables the valve to operate either as a normally opened or a normally closed valve.

The present invention describes a control valve that can be used with small modifications in many applications. Among the features of the present invention are a modifiable flow area that can be easily changed by adjusting the stroke of the solenoid valve or a corresponding annular flow area. In addition with minor modifications the present invention is capable of operating as a normally opened valve or as a normally closed valve. A basic concept employed in the present invention is to separate the solenoid function from the valve function. This enables the valve element to be changed without changes to the solenoid. In addition if a common solenoid is used with many valve elements a corresponding decrease in the cost of production of the solenoid control valve is achieved through the economy of large volumes.

Accordingly the present invention comprises: a solenoid control valve having: a stator adapted to receive an electric activation signal and to generate a magnetic field upon activation and a valve body adapted to engage a coacting surface of said stator having: an inwardly extending first bore; an inwardly extending stepped bore, an upraised boss extending axially upward from the bottom of the narrow portion of said stepped bore, the boss including an axially extending hole communicating the first bore with the said stepped bore. The valve further includes an armature comprising a ferro-magnetic first portion and a piston extending therefrom, the first portion is reciprocally situated within the first bore, and the piston is reciprocally received and extends through the hole in the boss. A spring retainer is attached to and is movable with that portion of the piston extending beyond the boss. The spring is received within the volume between the walls of the narrow portion of the stepped bore and the exterior walls of the boss for outwardly biasing the spring retainer and the armature. The control valve includes a reversible valve means including a valve seat adapted to be received within the stepped bore of the valve body and at least one flow passage adapted to receive fluid and further includes a movable valve closure element such that when the valve seat is received in one orientation the solenoid valve is of the normally open variety and when inserted in an opposite orientation the solenoid valve is of the normally closed variety.

BRIEF DESCRIPTION OF THE DRAWINGS

In the drawings:
FIG. 1 is a cross-sectional view of one embodiment of the present invention.

DETAILED DESCRIPTION OF THE DRAWINGS

Figure 3:
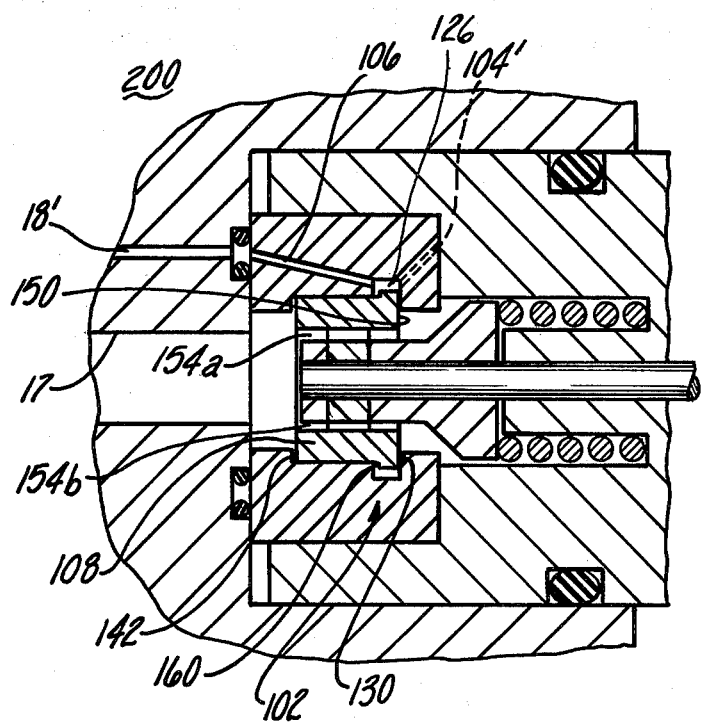
FIG. 3 illustrates another embodiment of the present invention showing a normally open valve, shown however, in its energized or closed position.

Reference is made to FIG. 1 which illustrates a normally closed solenoid actuated control valve 10 shown in its de-energized condition. The solenoid control valve 10 includes a stator 12 of a known variety and a valve body 20. The stator 12 and valve body 20 are adapted to fit within a stepped bore 14 of a coacting apparatus 16. The narrow end 17 of the stepped bore 14 comprises a fluid flow path. The apparatus 16 further includes at least one fluid supply or second passage 18 for communicating fuel to the control valve 10. The valve body 20 also includes a first surface 22 that is adapted to coact with a mating surface of the stator 12. The valve body 20 also includes a first bore 24 extending inwardly from the first surface 22 and a second surface 26, oppositely situated from the first surface 22. A stepped bore 28 extends inwardly from the second surface 26. The stepped bore 28 includes: a larger portion 30, a body shoulder 32, and a narrow portion 34. An upraised boss 36 extends axially from the bottom of the narrow portion 34. The boss 36 includes an axially extending hole 38 communicating the first bore 24 with the stepped bore 28. Another passage 39 communicates the first bore 24 to the narrow portion 34 of the stepped bore 28.

The valve 10 further includes an armature 40 comprising a ferro-magnetic first portion 42 and a piston member 44 extending therefrom. The ferro-magnetic portion 42 is reciprocally situated within the first bore 24 while the piston member 44 is reciprocally received in and extends through the hole 38 of the boss 36.

A spring retainer 60 is attached to and movable with that portion of the piston member 44 extending beyond the boss 36. A spring 62 is received within the volume between the walls of the narrow portion 34 of the stepped bore 28 and the exterior walls of the boss 36 for biasing the spring retainer 60 and the armature 40 toward the second surface 26 of the valve body 20. The control valve 10 further includes valve means 100 (more clearly illustrated in FIG. 2). The valve means 100 may be reversible such that either end 122 or 124 may be inserted within the stepped bore 28. The valve means 100 is adapted to be received within the large portion 30 of the stepped bore 28. The valve means includes a valve seat 102, having at least one flow path 104 or 106 that is communicated with the flow passage 18, and a movable valve closure element 108. If the valve seat 102 includes both of the flow paths 104 and 106, as described below, the orientation of the valve means 100 within the stepped bore 28 defines a solenoid valve of the normally open variety (see FIG. 3) while the insertion of the valve means 100 in its opposite orientation defines a solenoid valve 10 of the normally closed variety.

Figure 2:
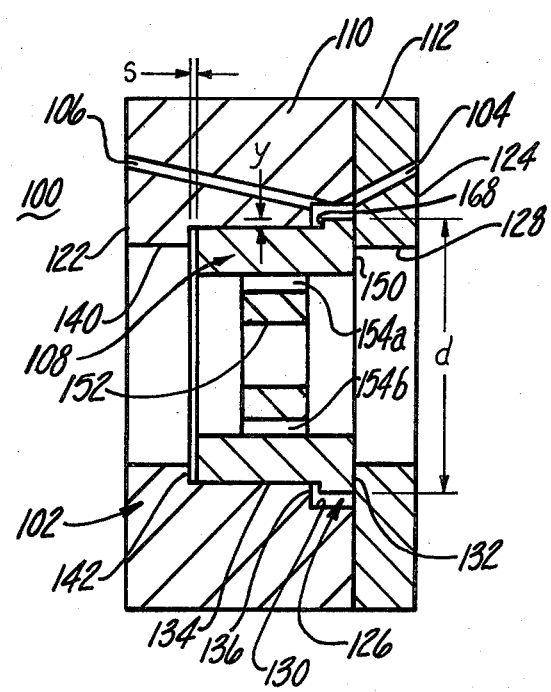
FIG. 2 illustrates an interchangeable valve element.

Reference is again made to FIG. 2 which illustrates the features of the valve means 100 including a valve seat 102 and a valve closure element 108. In the preferred embodiment the elements of the valve means may be fabricated of hardened steel. In addition as illustrated in FIG. 2, the valve means 100 may be constructed of a two-part assembly 110, 112. It should be noted that the two-part construction of the valve seat 102 is not a requirement of the invention. In addition the surface finish of the mating surfaces of the assembly members 110 and 112 should be sufficient to deter leakage therebetween. The valve seat 102 includes a first end 122, a second end 124, a stepped bore 126 having a first portion 128 that extends inwardly from the second end 124. The stepped bore 126 includes a second portion 130 that has a diameter that is larger than the diameter of the first portion 128 and wherein the transistion between the first and the second portions defines a valve seat surface 132. The valve seat 102 further includes a middle portion 134 that preferably has a diameter that is less than the diameter of the second portion 130 wherein the transition between the second portion 130 and the middle portion defines a shoulder 136, and a third portion 140 having a diameter that is preferably less than the diameter of the middle portion 134 wherein the third portion 140 extends through to the first end 122 and wherein the transition between the middle portion 134 and the third portion 140 defines another shoulder 142. As illustrated in FIG. 2 the flow passages 104 and 106 communicate the second portion 130 with the first end 122 or with the second end 124.

As previously mentioned the valve means 100 further includes the valve closure element 108. The valve closure element 108 is attached to and movable with the piston member 44. In addition the valve closure element 108 is adapted to fit within the stepped bore 126 and is movable to a first position in contact with the valve seat surface 132 and to a second position that may be in contact with the shoulder 142. The motion between the first and second positions defines the stroke 's' of the valve closure element 108. The valve closure element 108 as shown in FIG. 2 comprises a blunt face 150 that is adapted to engage and seal against the valve seat surface 132. FIG. 1 shows an alternate valve closure element 108 having a tapered face 150'. The valve closure element 108 further includes a central bore 152 adapted to receive the piston 44 and also preferably includes a plurality of flow passages such as passages 154a and 154b (only two such passages are shown). These flow passages 154 are useful in communicating fuel to and from the control valve 10 when configured in a normally opened valve configuration as illustrated in FIG. 3.

Reference is again made to FIG. 1 which illustrates a normally closed solenoid valve 10. As illustrated therein the valve closure element 108 is sandwiched between the spring spacer 60 and a valve cap 160 that is attached to the extending end of the piston member 44. The utilization of a valve cap 160 threadably attached to the piston member 44 is one means for permitting the valve closure element to be movable with the piston member 44. Alternate means of attaching the valve closure element to the piston would include the use of a threadable connection or weld at the valve closure element/piston interface.

The operation of the normally closed valve of FIG. 1 is as follows. In this configuration the valve seat 102 is installed such that the first surface 122 is positioned against the shoulder 32. Fuel is communicated to the control valve 10 through the fuel passage 18. The valve closure element 108 is biased by the action of the spring retainer 60 and spring 62 against the valve seat surface 132 to cause the valve face 150 (or 150') to prevent the fuel within passage 104 from being communicated through to the passage 17. Upon receipt of an activation signal the armature 40 draws the valve closure element 108 to the right therein creating a flow path to permit fuel to flow out of the control valve 10.

Reference is again made to FIG. 3 which illustrates a control valve 200 of the normally opened variety. In addition the control valve 200 is illustrated in its energized position with the valve face 150 against valve seat surface 132 of valve seat 102. Upon termination of the activation signal the spring 62 and spring retainer 60 will urge the valve closure element 108 to seat upon the shoulder 142. In this de-energized position fuel is communicated from a fuel inlet passage designated as 18', through the fuel passage 106 into the stepped bore 126, then through the flow passages 154 and into the flow passage 17. As can be seen the only substantive difference between the valve 10 and the control valve 200 is the orientation of the valve seat 102 and the relative placement therein of the fuel passages 104' or 106. It is contemplated that the valve seat 102 can be manufactured as having either a single flow passage 104 as illustrated in FIG. 1 or it may be fabricated for universal application having at least two flow passages (104' and 106) fabricated therein. One such valve seat having two fuel passages 106 and 104' is shown in FIG. 3 wherein the second passage namely 104' is shown in phantom lines. The unused passage 104' is sealed by interaction with the shoulder 32.

The fit between the valve closure element 108 and the valve seat 102 is such as to provide an efficient seal against high pressure fuel that is applied to the second portion 130 of the stepped bore 126. It is anticipated that a diametral clearance of 0.0001 inches (0.00254 mm.) for a stroke length of approximately 0.20 inches (5.08 mm.) should be adequate to seal diesel fuel under a pressure of 5,000 psi (350 bars) with a leakage of less than 5 cc/min. The dimension 'y' which forms a peripheral lip 168 on the valve seat 102 (see FIG. 2) can be changed to give the requisite degree of pressure balancing. It should be appreciated that the valve closure element 108 will be perfectly pressure balanced when the dimension 'y' of lip 168 is equal to zero. However as 'y' is increased additional sealing force capability is generated. The stroke 's' and the annular flow diameter 'd' can be modified according to the flow requirements.

The air gap between the ferro-magnetic first portion 42 of the armature means 40 can be set for a normally open valve in the following manner. In this procedure the stator 12 and valve body 20 would be inserted into an assembly fixture (not shown) similar to the coacting apparatus 16. The assembled valve means 100 would be installed by sliding it over the shaft of the piston member 44. The valve body 20, armature 40 and valve means 100 would be inserted into the assembly fixture with a shim inserted between the armature 40 and the stator 12. The stator 12 is then energized and the separation between the stator and armature 40 determined by the thickness of the shim. The valve cap 160 can be screwed onto the end of the shaft of the piston member 44 until the valve face 150 is seated upon the valve seat surface 132. The valve cap 160 would thereafter be crimped or otherwise secured to prevent it from loosening. Having established the desired stroke of the solenoid the valve body 20 is ready for final installation at a later time.

In summary the present invention provides for a solenoid actuated control valve having a common solenoid that can be utilized in conjunction with many valve bodies. In addition the flow characteristics of each valve body can be completely determined by the valve seat 102 and valve closure element 108. The valve face can be utilized as a universal element easily converting the solenoid valve into a normally opened or normally closed variety. In addition pressure balancing and the clamping force exerted at the seat surface 132 can be accomplished by changing the diameter 'y' as discussed above.

Many changes and modifications in the above-described embodiment to the invention can of course be carried out without departing from the scope thereof. Accordingly, that scope is intended to be limited only by the scope of the appended claims.

What is claimed is:

1. A solenoid control valve having a normally open and a normally closed mode of operation comprising:
    a stator adapted to receive an electric activation signal and to generate a magnetic field upon activation;
    a valve body adapted to engage a coacting surface of said stator comprising: an inwardly extending first bore; an inwardly extending stepped bore, an upraised boss extending axially upward from the bottom of the narrow portion of said stepped bore, said boss including an axially extending hole communicating said first bore with said stepped bore;
    an armature comprising a ferro-magnetic first portion and a piston extending therefrom, said first portion reciprocally situated within said first bore, and said piston reciprocally received and extending through said hole of said boss;
    a spring retainer attached to and movable with a portion of said piston extending beyond said boss;
    a spring received within the volume between the walls of said narrow portion of said stepped bore and the exterior walls of said boss for outwardly biasing said spring retainer and said armature;
    reversible valve means received within said portion of said stepped bore for establishing the normally open and normally closed mode of operation defined by the placement of said valve seat in one of two orientations comprising: a valve seat having at least one flow passage and a valve seating surface and adapted to be received within said portion of said stepped bore in said two orientations and a valve closure element movable by said armature for seating on said valve seating surface;
    a first end, a second end, a second stepped bore having a first portion extending inwardly from said second end, a second portion having a diameter larger than the diameter of said first portion, wherein the transition between said first and said second portions defines a valve seat surface, a middle portion having a diameter less than the diameter of said second portion wherein the transition between said second portion and said middle portion defines a second shoulder, a third portion having a diameter less than the diameter of said middle portion, said third portion extending through to said first end, and the transition between said middle portion and said third portion defining a third shoulder.

2. The valve as defined in claim 1 further including at least one fluid passage communicating said second portion with said first end and said second end.

3. The valve as defined in claim 2 wherein said valve closure element is attached to and movable with said piston member and wherein said valve closure element is adapted to fit within said stepped bore of seat valve seat and is movable between said valve seat and said third shoulder.

4. The valve as defined in claim 3 wherein said valve closure element comprises a tapered face adapted to engage and seal against said valve seat.

5. The valve as defined in claim 4 wherein said valve is normally open (absent said activation signal) and wherein said second end is mounted upon said body shoulder, and wherein said at least one fluid passage extends from said first end to said second portion of said stepped bore of said valve seat.

* * * * *